United States Patent Office

3,772,235
Patented Nov. 13, 1973

3,772,235
COPOLYMERS AND HYDROGELS OF UNSATURATED HETEROCYCLIC COMPOUNDS
Paul Stamberger, Baltimore, Md., assignor to Union Optics Corporation, Verona, Pa.
No Drawing. Filed Oct. 5, 1971, Ser. No. 186,822
Int. Cl. C08f 19/10, 41/06
U.S. Cl. 260—29.6 HN   20 Claims

ABSTRACT OF THE DISCLOSURE

Water insoluble but water swellable polymer comprising certain N-vinyl or N-allyl heterocyclic compounds; and glycidyl methacrylate, and/or glycidyl acrylate and/or glycidyl crotonate. The polymer may be swelled in aqueous solution to provide a transparent hydrogel having excellent physical and optical properties, and suitable in an ophthalmic lens.

BACKGROUND OF THE INVENTION

The present invention is related to novel polymers which are water insoluble but are water swellable to form hydrogels which are transparent and which have excellent physical and optical properties. More particularly, this invention is related to shape retaining transparent articles obtained from such hydrogels and more particularly opthalmic lenses such as contact lenses.

Recently considerable attention has been directed to obtaining polymers which are suitable to prepare hydrogels and particularly those hydrogels useful as contact lenses.

For example, U.S. Pat. 3,532,679 to Steckler discloses hydrogel materials, which according to the patentee, form suitable contact lenses. Such hydrogels are obtained from a heterocyclic N-vinyl monomer containing a carbonyl functionality adjacent to the nitrogen in the heterocyclic ring such as N-vinyl-2-pyrrolidone, a vinyl ester, or an acrylate ester, or a methacrylate ester, and a polyethylene glycol dimethacrylate cross-linking agent. According to Steckler, it is necessary to employ a polyethylene dimethacrylate cross-linking agent and to employ three different types of monomers in order to obtain hydrogels which have properties suitable for use as a contact lens. Moreover, Steckler indicates that much of the previous work with respect to hydrogels suitable for contact lenses was done employing either ethylene glycol dimethacrylate or polyethylene glycol dimethacrylate cross-linking agents. For instance, U.S. Pats. 2,976,576 and 3,220,960 and Otto Wichterle et al. and an article by M. F. Refojo et al. in the Journal of Applied Polymer Science, vol. 9, pp. 2425–35 (1965) describe various hydrogel polymers including those employing an ethylene glycol dimethacrylate cross-linking agent for producing a hydrogel.

It has been found according to the present invention, however, that it is not necessary to employ a polyethylene glycol dimethacrylate or similar material, and that only two different types of monomers are needed in polymers of certain heterocyclic nitrogen containing compounds in order to obtain hydrogels possessing those properties necessary to prepare acceptable ophthalmic lenses. The present invention therefore provides novel copolymers obtained from certain heterocyclic nitrogen-containing monomers; and certain novel hydrogel producing comonomers in specific relative amounts.

BRIEF DESCRIPTION OF INVENTION

The present invention is concerned with water insoluble but water swellable copolymers of a monomer mixture comprising:

(A) from about 40 to about 75% by weight of a heterocyclic N-vinyl monomer containing a carbonyl functionality adjacent to the nitrogen in the heterocyclic ring and/or a heterocyclic N-allyl monomer containing a carbonyl functionality adjacent to the nitrogen in the heterocyclic ring; and
(B) from about 25 to about 60% by weight of glycidyl methacrylate and/or glycidyl acrylate and/or glycidyl crotonate; and hydrogels obtained therefrom.

DESCRIPTION OF PREFERRED EMBODIMENTS

The heterocyclic monomers which are suitable in obtaining the polymers of the present invention must be water soluble and must contain a carbonyl functionality adjacent to the nitrogen in the heterocyclic ring. In addition, such monomers must contain a vinyl or an allyl group bonded to a nitrogen atom of the heterocyclic ring. Also, the heterocyclic monomer should be capable of homopolymerizing to a water soluble material.

Examples of some suitable heterocyclic monomers containing a carbonyl functionality adjacent to the nitrogen in the heterocyclic ring and containing a vinyl or allyl group pedent from a nitrogen in the heterocyclic ring include the lactams such as N-vinyl-2-pyrrolidone, N-vinyl-2-piperidone, N-vinyl-3-caprolactam and the corresponding allyl derivatives of such lactams. In addition, the various lactams may be substituted in the lactam ring by one or more lower alkyl groups such as methyl, ethyl, or propyl. Other heterocyclic monomers which can be employed in the present invention include N-vinyl imidazolidone, N-vinyl succinimide, N-vinyl diglycolylimide, N-vinyl glutarimide, N-vinyl-3-morpholinone, N-vinyl-5-methyl-3-morpholinone, and the corresponding allyl derivatives of such materials. It is understood of course that mixtures of such heterocyclic compounds can be employed in preparing the water swellable polymers of the present invention.

The preferred heterocyclic compounds employed are the N-vinyl lactams of which N-vinyl-2-pyrrolidone is the most preferred.

The amount of the heterocyclic compound employed in the monomeric mixture to prepare the polymers of the present invention is usually from about 40 to about 75% by weight. Polymers of monomeric mixtures containing about 50 to about 65% by weight of the heterocyclic compound exhibit an excellent combination of properties.

The other monomer employed in preparing the polymers of the present invention are the glycidyl esters of either methacrylic acid, acrylic acid, or crotonic acid. The most preferred glycidyl ester is glycidyl methacrylate. The amount of glycidyl ester employed is usually between about 25 and about 60% by weight. The preferred quantity of glycidyl ester is between about 35 and about 50% by weight. The above amounts of the heterocyclic monomer and the glycidyl ester are based upon the combined weight of these compounds but not necessarily upon the total weight of polymerizable compounds since other monomers can be present as will be discussed hereinbelow.

It was surprisingly discovered according to the present invention that the polyethylene glycol dimethacrylate cross-linking agents could be excluded without a concomitant loss in their function in the polymers of this invention. The polyethylene glycol dimethacrylate cross-linking agents are disclosed by Steckler in U.S. Pat. 3,532,679 as being essentially for obtaining hydrogels from polymers of the heterocyclic monomers employed in the polymers of the present invention. Moreover, it was surprisingly discovered that copolymers of only two different types of monomeric compounds instead of at least three different monomers as disclosed by Steckler in U.S. Pat. 3,532,679 could be produced which possess the various properties essential to provide polymers suitable for hydrogen formation and for ophthalmic lenses. To obtain these benefits of the present invention it is essential that the monomer other than the heterocyclic compound be a glycidyl ester of the type disclosed herein and that the disclosed relative proportions of the monomers in the monomeric mixture be observed. Steckler indicates that glycidyl methacrylate in heterocyclic copolymers containing the polyethylene glycol dimethylacrylate cross-linking agent performs the same function as other unsaturated esters such as the alkyl acrylates, methacrylates and vinyl esters. Table I on columns 5 and 6 of U.S. Pat. 3,532,679 clearly shows that the use of the glycidyl methacrylate in such a copolymer gave properties essentially the same as copolymers containing various alkyl methacrylates and alkyl acrylates. Accordingly, it seems apparent from the disclosure of Steckler that the polyethylene glycol dimethacrylate is necessary, that at least three monomers are required, and that the glycidyl methacrylate does not perform any cross-linking function therein. Also it seems apparent from the disclosure of Steckler that the dimethacrylate cannot be excluded without the critical loss of its function. This is further substantiated in the article entitled "Glyceryl Methacrylate Hydrogels" by M. F. Refojo in the Journal of Applied Polymer Chemistry, volume 9, pp. 3161–70 (1965). In particular, pages 3165 and 3168 of that article indicate that the presence of glycidyl methacrylate in preparing hydrogen copolymers of glyceryl methacrylate decreases the number of cross-links in the copolymer and subsequently increases the amount of water in the hydrogel.

The following statements by Refojo in that article are believed to be relevant to this discussion:

"The presence of glycidyl methacrylate in the copolymer seems to decrease the number of cross-links in the network, subsequently increasing the amount of water in the hydrogel.

"As it is well known for gel systems, the amount of liquid found on swelling glyceryl methacrylate hydrogels is inversely proportional to the extent of cross-linking in the network (FIG. 2). Nevertheless, residual glycidyl methacrylate in the glyceryl methacrylate does not seem to be the cause of network formation, since the addition of glycidyl methacrylate to aqueous solutions of glyceryl methacrylate and polymerization of the mixtures thereof yielded hydrogels which at equilibrium held even more water than the gels prepared under the same conditions but without the addition of glycidyl methacrylate. . . ."

Accordingly, it was quite surprising that the glycidyl esters of the present invention could be employed to produce the water insoluble, but water swellable polymers of the present case and when employed it was not necessary to employ the polyethylene glycol dimethacrylates. Also it was quite surprising that polymers suitable for hydrogel formation could be obtained from only two different types of monomers when one of the monomers is a heterocyclic polymerizable compound of the type employed herein.

In addition, it was surprisingly found that copolymers prepared from the above-described monomers contain all those properties which are crucial in manufacture of ophthalmic lenses such as contact lenses. To find suitable polymers is quite difficult since there are numerous properties which must be satisfied before a material can be utilized as a contact lens. However, it has been found that the polymers of the present invention do possess those qualities which are necessary for hydrogen contact lenses. Hydrogels obtained from water swellable polymers of the present invention when swollen have very good optical qualities and high strength characteristics; and are transparent.

The hydrogels obtained from the polymers of the present invention contain from about 10 to about 90% by weight of an aqueous liquid, and preferably contain from about 30 to about 70% by weight of an aqueous liquid. In addition, hydrogels can be obtained by swelling the polymers of the present invention with water soluble swelling agents instead of aqueous solutions. Some examples of water soluble swelling agents include ethylene glycol, the liquid polyethylene glycols, the glycol esters of lactic acid, formamide, dimethyl formamide, dimethyl sulfoxide, and the like. Accordingly, the term "hydrogels" as used herein, includes polymers which are swelled with water soluble swelling agents as well as are swelled with aqueous solutions. However, when the hydrogel is to be employed as a contact lens, it will be necessary to replace any water soluble liquid with the aqueous solution. The hydrogel contact lens should of course contain a physiological saline solution as the aqueous medium. This is in order to provide a contact lens which is in a state of osmotic equilibrium with physiological saline solution.

The polymers of the present invention are preferably prepared employing bulk polymerization techniques. The term "bulk polymerization" as used herein includes those polymerizations carried out in the absence of a solvent or dispersing liquid as well as those polymerizations carried out in the presence of water, or water soluble, or polymer soluble liquid swelling agents in such amounts as not to significantly alter the nature of the polymerization process. For example, the amount of water or other swelling agent for the polymerization to be a bulk polymerization is less than the quantity of such agent necessary to dissolve or disperse the monomers, thereby providing the monomers with the freedom of movement which alters the nature and mechanism of the polymerization.

The polymerization catalyst employed can be any of the catalysts which are suitable in polymerizing compounds containing ethylenical unsaturation, and preferably are the free radical catalysts. Of particular interest are the azo type catalysts such as azobisisobutyronitrile and the peroxide catalysts. Some examples of suitable peroxide catalysts include hydrogen peroxide, benzoyl peroxide, tert-butyl peroctoate, phthalic peroxide, succinic peroxide, benzoyl acetic peroxide, coconut oil acid peroxide, lauric peroxide, stearic peroxide, oleic peroxide, tert-butyl hydroperoxide, tetraline hydroperoxide, tert-butyl diperphthalate, cumene hydroperoxide, tert-butyl-perbenzoate, acetyl peroxide, 2,4-dichlorobenzoyl peroxide, urea peroxide, caprylyl peroxide, p-chlorobenzoyl peroxide, ditert-butyl peroxide, 2,2-bis(tert-butyl peroxy)-butane, hydroxyheptyl peroxide, the diperoxide of benzaldehyde, and the like. The preferred catalyst is one which is effective at moderately low temperatures such as about 50–70° C., such as tert-butyl peroctoate.

In addition to the free radical polymerization catalyst, the catalyst can include those materials which accelerate polymerization primarily by opening of the epoxide group of the glycidyl ester. Such catalysts include p-toluene sulfonic acid, sulfuric acid, phosphoric acid, aluminum chloride, stannic chloride, ferric chloride, boron trifluoride, boron trifluoride-ethyl ether complex, and iodine. It may be desirable to employ a multistage polymerization process. For instance, the polymerization can initially be conducted until substantially all of the unsaturated grouping have polymerized, and then can be conducted to effect polymerization through the breaking of the oxirane group of the glycidyl ester and condensation.

The amount of catalyst employed depends upon the type of catalyst system used and is generally from about 0.01 to about 10 parts by weight per 100 parts of the monomer mixture, and preferably is from about 0.1 to about 1 part by weight of per 100 parts of the monomer mixture.

The polymerization is generally carried out at temperatures from about room temperature to about 150° C. It is generally preferred to initiate the polymerization at relatively low temperatures such as from about 35 to about 85° C., and then increase the temperature to about 90 to about 150° C. as the reaction continues and preferably after most of the reaction has been completed. The most preferred initial temperature range of polymerization is between about 50 and 60° C.

Usually the polymerization is conducted under autogenous pressure in a closed reaction vessel. However, any suitable means to prevent significant evaporation of any of the monomers can be employed.

Generally, the polymerization is completed in about 4 to about 24 hours and preferably is completed in about 6 to 18 hours. It is understood, of course, that the time and temperature are inversely related. That is, temperatures employed at the upper end of the temperature range will provide polymerization processes which can be completed near the lower end of the time range.

In addition, it may be desirable for the copolymers obtained from such polymerizations to be post cured at temperatures somewhat higher than those initially employed in the polymerization. Usually the temperatures employed for a post cure will range from about 90° to about 150° C. Five hours is usually more than sufficient for such a post curing operation. Preferably the post cure is completed in one or two hours.

After the polymerization is completed, and usually after suitable shaping or machining operations, and after any water soluble impurities are leached out, the polymer can then be contacted with a suitable liquid in order to obtain the hydrogel materials which can then be employed as ophthalmic lenses.

The polymerization and post curing, if employed, may be carried out in a mold or cast conforming to the general or exact shape and/or size of the desired product. After the polymer is completed, including any post curing, a firm, rigid, and clear copolymer is obtained. The polymers of the present invention possess other important characteristics such as having excellent machineability and polishing characteristics. This material, if necessary, can then be further fabricated into various sizes and shapes or cut into the exact shape and size of a desired product. The fabricated product can then be swelled in a suitable liquid until equilibrium is reached or until a hydrogel containing the desired amount of liquid such as aqueous liquid is reached.

The hydrogels which can be obtained from the polymers of the present invention are clear and exhibit good tear resistance. Also the hydrogels may be elastic or may be rigid depending upon the relative amounts and specific monomers used. Moreover, they possess the necessary optical properties essential for ophthalmic devices.

The inclusion of other copolymerizable ethylenically unsaturated monomers in such amounts which do not drastically alter the properties of the polymers of the present invention is intended to come within the scope of the present invention. Such other monomers include hydroxy alkyl acrylates, hydroxy alkyl methacrylates, alkyl acrylates, alkyl methacrylates, vinyl esters of saturated monocarboxylic acids, methacrylates and/or acrylates of amino alcohols. Some specific monomers which can be present in the present invention include hydroxy ethyl methacrylate, hydroxy ethyl acrylate, hydroxy propyl methacrylate; diethylene glycol monomethacrylate; diethylene glycol monoacrylate; acrylamide; methacrylamide; the monovinyl and monoallyl esters of polycarboxylic hydroxy acids such as tartaric acid, maleic acid, or citric acid; allyl ethers of polyhydric sugars such as sorbitol or mannitol; glycol monoesters of olefinic acids such as itaconic acid and maleic acid; alkyl methacrylates or acrylates wherein the alkyl group contains up to 22 carbon atoms such as methyl methacrylate, ethyl methacrylate, isopropyl methacrylate, butyl methacrylate, capryl methacrylate, palmityl methacrylate, stearyl methacrylate, lauryl methacrylate, ethyl acrylate, methyl acrylate, isopropyl acrylate, butyl acrylate, and lauryl acrylate; and vinyl esters of monocarboxylic acids wherein the acids contains up to about 22 carbon atoms such as vinyl acetate, vinyl propionate, vinyl butyrate, and vinyl stearate.

In order to better understand the present invention, the following examples are given wherein all parts are by weight unless the contrary is stated.

Example 1

70 parts of N-vinyl-2-pyrrolidone and 30 parts of glycidyl methacrylate are admixed with 0.5 part of tert-butyl peroctoate catalyst. The polymerization mixture is then poured into individual polypropylene stationary circular molds of ¾ inch inside diameter and ⅜ inch depth.

The polymerization of the material is effected by initially heating the mixture to about 52° C. for 18 hours. The polymerization is then completed by heating for 2 hours at 95° C. After the polymerization is completed, a clear, firm, and rigid copolymer is obtained. The polymerized material is then placed on a conventional contact lens lathe such as one obtainable from Hardinge Brothers, Elmira, N.Y., and then is ground and polished. It is then contacted with physiological saline solution until it is in the state of osmotic equilibrium with the physiological saline solution.

The hydrogel lens obtained is clear, flexible, and elastic, has excellent optical properties, adequate strength characteristics, and has a water content of about 70.6% at osmotic equilibrium.

Example 2

Example 1 is repeated except that the amount of N-vinyl-2-pyrrolidone is 60 parts and the amount of glycidyl methacrylate is 40 parts.

The results obtained are similar to those of Example 1 except that the hydrogel at osmotic equilibrium has a water content of 53.5% and is stronger than the hydrogel of Example 1.

Example 3

50 parts of N-vinyl-2-pyrrolidone and 50 parts of glycidyl methacrylate are admixed with 0.5 part of tert-butyl peroctoate catalyst. The polymerization mixture is then poured into individual polypropylene stationary circular molds of ¾ inch inside diameter and ⅜ inch depth.

The polymerization is effected by initially heating the mixture to 52° C. for 18 hours. The polymerization is then completed by heating for 2 hours at 95° C. After the polymerization is completed, a clear, rigid, and firm copolymer is obtained. The polymerized material is then processed according to the method described in Example 1 to produce a hydrogel contact lens.

The hydrogel lens obtained is clear, flexible, and elastic, has excellent optical properties, and has a water content of about 44.5% at osmotic equilibrium. The hydrogel has better strength characteristics as compared to the hydrogel of Example 1.

Comparison Example 4

85 parts of N-vinyl-2-pyrrolidone and 15 parts of glycidyl methacrylate are admixed with 0.4 part of tert-butyl peroctoate catalyst. The polymerization mixture is then poured into individual polypropylene stationary circular molds of ¾ inch inside diameter and ⅜ inch depth.

The polymerization of the material is effected by initially heating the mixture to about 50–55° C. for 10 hours. The polymerization is then completed by heating for 1 hour at 90° C. and then heating for another hour at 120° C. After the polymerization is completed, a clear, but weak, copolymer is obtained. The polymerized material is not strong enough to be machined or polished according to usual lens producing techniques.

Comparison Example 5

Example 2 is repeated except that the amount of glycidyl methacrylate is 20 parts and the amount of N-vinyl-2-pyrrolidone is 80 parts. The results obtained are similar to Example 4 in that a polymer is obtained which is not strong enough to be machined or polished according to usual lens producing techniques.

A comparison of Examples 1–3 with Examples 4 and 5 clearly demonstrates the efficacy of the materials of the present invention as compared to those outside the scope of this invention. It is quite apparent from this comparison that the relative quantities of the heterocyclic compound and glycidyl ester are quite crucial in providing copolymers of the two types of monomers set forth herein which possess the necessary qualities for hydrogels usable in ophthalmic lenses.

What is claimed is:

1. A water insoluble but water swellable copolymer of a monomer mixture consisting essentially of:
   (A) a heterocyclic polymerizable N-vinyl compound containing a carbonyl functionality adjacent to the nitrogen in the heterocyclic ring and being selected from the group consisting of N-vinyl lactams, N-vinyl imidazolidone, N-vinyl succinimide, N-vinyl diglycolylimide, N-vinyl glutarimide, N-vinyl-3-morpholinone, N-vinyl-5-methyl-3-morpholinone, and mixtures thereof; and
   (B) a glycidyl ester selected from the group consisting of glycidyl methacrylate, glycidyl acrylate, glycidyl crotonate, and mixtures thereof; said monomer mixture containing from about 40 to about 75% by weight of said heterocyclic polymerizable compound and from about 25 to about 60% by weight of said glycidyl ester based upon the combined weight of (A) and (B) in said monomer mixture.

2. The copolymer of claim 1 wherein said heterocyclic polymerizable compound is a N-vinyl lactam.

3. The copolymer of claim 2 wherein said glycidyl ester is glycidyl methacrylate.

4. The copolymer of claim 1 wherein said heterocyclic compound is N-vinyl-2-pyrrolidone.

5. The copolymer of claim 1 wherein said glycidyl ester is glycidyl methacrylate.

6. The copolymer of claim 1 wherein said monomer mixture comprises about 50 and 65% by weight of said heterocyclic polymerizable compound, and between about 35 and 50% by weight of said glycidyl ester based upon the combined weight of (A) and (B).

7. The copolymer of claim 6 wherein said heterocyclic polymerizable compound is N-vinyl-2-pyrrolidone and said glycidyl ester is glycidyl methacrylate.

8. A shape retaining hydrogel consisting essentially of the copolymer of claim 1 and from about 10 to about 90% by weight of water.

9. The hydrogel of claim 8 which is in the form of a contact lens.

10. The copolymer of claim 1 which is a bulk polymerized copolymer.

11. The copolymer of claim 1 wherein said heterocyclic polymerizable compound is selected from the group consisting of N-vinyl-2-pyrrolidone, N-vinyl-2-piperidone, N-vinyl-3-caprolactam, N-vinyl-imidazolidone, N-vinyl-succinimide, N-vinyl-diglycolylimide, N-vinyl-glutarimide, N-vinyl-3-morpholinone, N-vinyl-5-methyl-3-morpholinone, and mixtures thereof.

12. The shape-retaining hydrogel of claim 8 wherein said water is a physiological saline solution.

13. A shape-retaining hydrogel consisting essentially of the copolymer of claim 1 and from about 30 to about 70% by weight of water.

14. The hydrogel of claim 13 wherein said water is a physiological saline solution.

15. The hydrogel of claim 14 which is in the form of a contact lens.

16. The hydrogel of claim 13 which is in the form of a contact lens.

17. A shape-retaining hydrogel consisting essentially of a bulk polymerized water insoluble but water swellable copolymer of a monomer mixture consisting essentially of:
   (A) a heterocyclic polymerizable compound selected from the group consisting of N-vinyl-2-pyrrolidone, N-vinyl-2-piperidone, N-vinyl-3-caprolactam, N-vinyl-imidazolidone, N-vinyl-succinimide, N-vinyl-diglycolylimide, N-vinyl-glutarimide, N-vinyl-3-morpholinone, N-vinyl-5-methyl-3-morpholinone, and mixtures thereof; and
   (B) a glycidyl ester selected from the group consisting of glycidyl methacrylate, glycidyl acrylate, glycidyl crotonate, and mixtures thereof;
said monomer mixture containing between about 50 and 65% by weight of said heterocyclic polymerizable compound and between about 35 and 50% by weight of said glycidyl ester based upon the combined weight of (A) and (B) in said monomer mixture; and from about 30 to about 70% by weight of water.

18. The hydrogel of claim 17 wherein said water is a physiological saline solution.

19. The hydrogel of claim 18 which is in the form of a contact lens.

20. The hydrogel of claim 17 wherein said heterocyclic polymerizable compound is N-vinyl-2-pyrrolidone.

References Cited

UNITED STATES PATENTS 3,532,679  10/1970  Steckler.

OTHER REFERENCES

Ibrasimor et al.: Vysokomol. Soedin., Ser. A 12, 2621–24 (1970).

MELVIN GOLDSTEIN, Primary Examiner

U.S. Cl. X.R.

260—86.1 N